US011385347B2

(12) United States Patent
Maschhoff et al.

(10) Patent No.: US 11,385,347 B2
(45) Date of Patent: Jul. 12, 2022

(54) SATELLITE TOMOGRAPHY OF RAIN AND MOTION VIA SYNTHETIC APERTURE

(71) Applicant: BAE Systems Information and Electronic Systems Integration Inc., Nashua, NH (US)

(72) Inventors: Kevin R. Maschhoff, Wakefield, MA (US); Martin F. Ryba, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 124 days.

(21) Appl. No.: 16/621,606

(22) PCT Filed: May 30, 2018

(86) PCT No.: PCT/US2018/035021
§ 371 (c)(1),
(2) Date: Dec. 11, 2019

(87) PCT Pub. No.: WO2018/231515
PCT Pub. Date: Dec. 20, 2018

(65) Prior Publication Data
US 2020/0150268 A1 May 14, 2020

Related U.S. Application Data (60) Provisional application No. 62/519,283, filed on Jun. 14, 2017.

(51) Int. Cl.
*G01S 13/95* (2006.01)
*G01S 13/90* (2006.01)
(Continued)

(52) U.S. Cl.
CPC .......... *G01S 13/955* (2013.01); *G01S 13/003* (2013.01); *G01S 13/878* (2013.01);
(Continued)

(58) Field of Classification Search
CPC .. G01S 13/955; G01S 13/9052; G01S 13/003; G01S 13/878; G01S 13/9023; H04B 7/18576; H04B 7/01
(Continued)

(56) References Cited

U.S. PATENT DOCUMENTS

| 5,093,563 A * | 3/1992 | Small | G02B 27/58 |
| | | | 250/353 |
| 5,309,479 A * | 5/1994 | Cheah | H03D 7/161 |
| | | | 375/306 |

(Continued)

FOREIGN PATENT DOCUMENTS

| EP | 1065518 A2 * | 1/2001 | ............ G01S 13/87 |
| EP | 1065518 A2 | 1/2001 | |

(Continued)

OTHER PUBLICATIONS

Im et al. Spaceborne Atmospheric Radar Technology, 2005, Jet Propulsion Laboratory, California Institute of Technology, Pasadena, CA 91109 (Year: 2005).*
(Continued)

*Primary Examiner* — Bernarr E Gregory
*Assistant Examiner* — Nuzhat Pervin
(74) *Attorney, Agent, or Firm* — Scott J. Asmus; Gary McFaline; KPIP Law, PLLC (57) ABSTRACT

The system and method represents a high-resolution, three-dimensional, multi-static precipitation RADAR approach that employs agile microsatellites, in formation and remotely coupled, via a new high-precision, ultra-low power, remote timing synchronization technology. This sys-
(Continued)

tem and method uses multi-static RADAR interferometric methods implemented via a microsatellite formation to synthesize an effectively large (e.g., 15 m) aperture to provide about 1 km horizontal resolution and about 125 m vertical resolution in the Ku-band.

9 Claims, 4 Drawing Sheets

(51) Int. Cl.
  G01S 13/00       (2006.01)
  G01S 13/87       (2006.01)
  H04B 7/185       (2006.01)
  H04B 7/195       (2006.01)
(52) U.S. Cl.
  CPC ...... *G01S 13/9023* (2013.01); *G01S 13/9052* (2019.05); *H04B 7/18576* (2013.01); *H04B 7/195* (2013.01)
(58) Field of Classification Search
  USPC ........................................................ 342/26 A
  See application file for complete search history.

(56) References Cited

U.S. PATENT DOCUMENTS

| | | | | |
|---|---|---|---|---|
| 5,311,188 | A * | 5/1994 | Meijer ................ | G01S 13/5248 342/160 |
| 5,659,318 | A * | 8/1997 | Madsen ............. | G01S 13/9023 342/25 C |
| 8,260,551 | B2 * | 9/2012 | Janky ..................... | G01S 19/07 342/357.44 |
| 9,019,143 | B2 * | 4/2015 | Obermeyer ............. | H01Q 1/28 343/705 |
| 9,345,029 | B2 * | 5/2016 | Monte .................. | H04B 7/2041 |
| 9,638,826 | B2 * | 5/2017 | Sokolowsky .......... | G01V 3/083 |
| 9,857,475 | B2 * | 1/2018 | Yunck ................. | G01S 13/9023 |
| 10,254,428 | B2 * | 4/2019 | Sokolowsky ....... | G01S 13/9023 |
| 2004/0150552 | A1 * | 8/2004 | Barbella ................. | G01S 13/24 342/111 |
| 2005/0195103 | A1 * | 9/2005 | Davis ..................... | H01Q 21/22 342/158 |
| 2007/0285315 | A1 * | 12/2007 | Davis ..................... | H01Q 21/22 342/377 |
| 2009/0102705 | A1 * | 4/2009 | Obermeyer ......... | G01S 13/9029 343/705 |
| 2011/0215962 | A1 * | 9/2011 | Culkin ................. | G01S 13/582 342/99 |
| 2013/0332115 | A1 * | 12/2013 | Pratt ...................... | G01N 22/04 702/189 |
| 2015/0123835 | A1 * | 5/2015 | Sokolowsky ....... | G01S 13/9023 342/22 |
| 2015/0268352 | A1 * | 9/2015 | Fischer .................. | G01S 19/23 342/357.27 |
| 2017/0212267 | A1 * | 7/2017 | Sokolowsky ............ | G01V 3/36 |

FOREIGN PATENT DOCUMENTS

| | | | |
|---|---|---|---|
| EP | 2401629 B1 * | 8/2016 | ............. G01S 13/18 |
| WO | WO-2013173782 A1 * | 11/2013 | ......... G01S 13/9023 |

OTHER PUBLICATIONS

Spaceborne Doppler radars for atmospheric dynamics and energy budget studies Simone Tanelli;Eastwood Im;Stephen L. Durden;Dino Giuli;Luca Facheris 2008 IEEE Radar Conference (Year: 2008).*
Jose-Luis Bueso-Bello et al.: "First Characterization and Performance Evaluation of Bistatic TanDEM-X Experimental Products", IEEE Journal of selected Topics in Applied Earth Observations and Remote Sensing, vol. 9, No. 3, Mar. 1, 2016, pp. 1058-1071, XP011600396, ISSN: 1939-1404, DOI: 10.1109/JSTARS.2015. 2430454.
Dimitri Moisseev et al.: "Influence of hydrometeors on in SAR observations", IEEE International Geoscience and Remote Sensing Symposium, vol. 6, Jul. 21, 2003, pp. 3811-3814, XP010703760, DOI: 10.1109/IGARSS.2003.1295278, ISBN: 978-0-7803-7929-9.
Luca Baldini et al.: "Analysis of dual polarization images of precipitating clouds collected by the COSMO SkyMed constellation", Atmospheric Research, vol. 144, Jul. 1, 2014, pp. 21-37, XP055769926, ISSN: 0169-8095, DOI: 10.1016/j.atmosres.2013. 05.010.
Yim S K et al: "Effect of Reconstruction 1-10 Parameters on Tomographic Imaging of Rainfall Fields from Multi-Parameter Microwave Observables", International Space Year: Space Remote Sensing. Houston, May 26-29, 1992; [Proceedings of the International Geoscience and Remote Sensing Symposium (IGARSS)], New York, IEE, US, May 26, 1992 (May 26, 1992), pp. 1521-1523, XP032304057, DOI: 10.1109/IGARSS.1992.578518 ISBN: 978-0-7803-0138-2 the *whole document*.
David Atlas et al.: "The Measurement of Precipitation with Synthetic Aperture Radar", Journal of Atmospheric and Oceanic Technology, vol. 4, No. 3, Sep. 1, 1987, pp. 368-376, XP055769724, ISSN: 0739-0572, DOI: 10.1175/1520-0426(1987)004<0368:TMOPWS>2.0.CO;2.
Sun Fenglin et al.: "Brief Introduction to Research on Spaceborne Synthetic Aperture Radar Retrieval of Precipitation", Advances in Meteorological Science and Technology, vol. 6, No. 1, Jan. 1, 2016, pp. 111-115, XP055769930, DOI: 10.3969/j.issn.2095-1973.2016. 01.017.
EP Search Report, 18818257.0, dated Feb. 9, 2021, 12 pages.
Atlas et al., "The Measurement of Precipitation with Synthetic Aperture Radar", Journal of Atmospheric and Oceanic Technology, vol. 4, pp. 368-376.
Im et al. Spaceborne Atmospheric Radar Technology., 2005 . [retrieved on Jul. 31, 2018). Retrieved from the Internet. <URL: http:f/cup.aos.wisc.edu/will/im_and_durden2005.pdf>. entire document.
Huffman, George J., David T. Bolvin, Eric J. Nelkin, David B. Wolff, Robert F. Adler, Guojun Gu, Yang Hong, Kenneth P. Bowman, and Erich F. Stocker, The TRMM Multisatellite Precipitation Analysis (TMPA): Quasi-Global, Multiyear, Combined-Sensor Precipitation Estimates at Fine Scales, Journal of Hydrometeorology 2007 8:1, 38-55.
Shepherd, J.M., Harold Pierce, and A. J. Negri, 2002: On rainfall modification by major urban areas: Observations from space-borne radar on TRMM. Journal of Applied Meteorology. 41, 689-701.
Kirschbaum, D. George Huffman, Gail Skofronick-Jackson, Scott Braun, Erich Stocker, Kevin Garrett, Erin Jones, Robert Adler and Huan Wu, Amy McNally, and Benjamin Zaitchik, "NASA's Remotely-sensed Precipitation: A Reservoir for Applications Users" submitted to BAMS, May 2016.
T. Kozu and T. Iguchi, "Non-uniform beam filling correction for spaceborne rain radar measurement: a simulation study using shipborne radar data over tropical Pacific," Geoscience and Remote Sensing, 1997. IGARSS '97. Remote Sensing—A Scientific Vision for Sustainable Development., 1997 IEEE International, 1997, pp. 1117-1119 vol. 3.
S. L. Durden and S. Tanelli, "Predicted Effects of Nonuniform Beam Filling on GPM Radar Data," in IEEE Geoscience and Remote Sensing Letters, vol. 5, No. 2, pp. 308-310, Apr. 2008.
Robert Meneghini and Liang Liao, Modified Hitschfeld-Bordan Equations for Attenuation-Corrected Radar Rain Reflectivity: Application to Nonuniform Beamfilling at Off-Nadir Incidence Journal of Atmospheric and Oceanic Technology 2013 30:6, 1149-1160.
Evan Ruzanksi and V.Chandrasekar, An Investigation of the Short-Term Predictability of Precipitation Using High-Resolution Composite Radar Observations, Journal of Applied Meteorology and Climatology 2012 51:5, 912-925.
Jakowatz, Jr., C. V., Wahl, D. E., et al., [Spotlight-mode Synthetic Aperture Radar: A Signal Processing Approach], Kluwer Academic Publishers, Boston (1996).

(56) References Cited

OTHER PUBLICATIONS

Jason P. Fritz and V. Chandrasekar, IEEE Transactions on Geoscience and Remote Sensing, 48,p. 3622-3637, 2010.
C.S. Ruf, et al., "New Ocean Winds Satellite Mission to Probe Hurricanes and Tropical Convection," BAMS 97, No. 3 (Mar. 2016), 385-395.
S. Gleason, 2006: Remote Sensing of Ocean, Ice and Land Surfaces Using Bistatically Scattered GNSS Signals From Low Earth Orbit, Ph.D. thesis, University of Surrey.
International Search Report, PCT/US2018/035021, dated Aug. 24, 2018, 8 pages.

* cited by examiner

FIG.3 remotely coupling at least one transmitting low earth orbit satellite with at least two receiving low earth orbit satellites (100)

↓ flying the at least one transmitting low earth orbit satellite and the at least two receiving low earth orbit satellites in formation (120)

↓ synchronizing the phases of the at least one transmitting low earth orbit satellite and the at least two receiving low earth orbit satellites (130)

↓ collecting and resolving a plurality of two-dimensional intensity images via the at least two receiving low earth orbit satellites along-track (140)

↓ operating the at least two receiving low earth orbit satellites in spotlight synthetic aperture RADAR mode (150)

↓ aggregating a plurality of two-dimensional intensity images to increase the signal to noise (160)

↓ collecting a plurality of visibility interferograms using cross-track, range-resolved long baseline interferometry via the at least one transmitting low earth orbit satellite (170)

↓ creating a three-dimensional precipitation field using the aggregated two-dimensional intensity images and the plurality of visibility interferograms (180)

FIG. 4

SATELLITE TOMOGRAPHY OF RAIN AND MOTION VIA SYNTHETIC APERTURE

CROSS REFERENCE TO RELATED APPLICATIONS

This Application claims the benefit of U.S. Provisional Patent Application No. 62/519,283, filed Jun. 14, 2017, the content of which is incorporated by reference herein in its entirety.

FIELD OF THE DISCLOSURE

The present disclosure relates to satellite tomography of precipitation and motion and more particularly to the use of synthetic aperture RADAR and range-resolved long baseline interferometry methods with precision inter-satellite synchronization to provide a three dimensional map of the rain field of a storm at high spatial resolution from space.

BACKGROUND OF THE DISCLOSURE

Ground-based weather RADAR data are used more for weather monitoring rather than weather prediction. Specifically, these RADAR "see" where it is raining now. Sometimes, of course, where it is raining now may provide clues to where it will rain soon. Current systems show where it is raining, and most importantly, where a severe storm is present. Ground-based RADAR has sufficient spatial resolution needed to characterize the more challenging storms, including mid-latitude thunderstorms. However, a major weakness in ground-based weather RADAR is that these instruments are nearly all based on land, leaving the storms occurring over much of the earth's surface unobserved by these RADAR systems. These RADAR instruments are also very large.

Space-based precipitation RADAR would be capable of observing such storms anywhere on earth. However, current space-based precipitation RADAR systems are very large and expensive instruments. And yet, even with their large antennas, current space-based RADAR systems do not provide sufficient spatial resolution (~1 km) to characterize many of the most important storms, including mid-latitude thunderstorms, from space. Current systems also have a limited cross-track spatial coverage (which relates to area coverage). The cross-track coverage they do have still serves important science goals, by providing a sampling of storms globally, even though they only observe a small fraction of the storms that actually occur. To be useful for characterizing severe weather anywhere on earth, one needs either wider cross-track coverage from a few RADAR systems, or many such RADAR systems in space. Both of these options would be prohibitively expensive.

Weather situation awareness, especially for severe weather, is an essential aspect of modern life, for those planning and executing military missions, and for those charged with protecting the public through the use of severe weather warnings. In order to characterize and predict severe weather events, observation methods must be capable of observing the three-dimensional structure of the atmosphere, and its motion.

It is understood that current active and passive systems lack the spatial resolution needed to characterize the atmosphere at storm-scale. Here, storm-scale is about 1 km resolution. Further, current space-based X-band synthetic aperture systems only provide two-dimensional imagery, which is influenced by precipitation. In fact, precipitation and surface backscatter signals are both present for a given range bin, thus making the precipitation effects hard to separate.

Current synthetic aperture systems perform two dimensional observations over a precipitation field at an oblique angle, mixing in surface and rain scattering. In contrast, the proposed method and system of the present disclosure provides for three-dimensional imagery, is capable of observing far off-axis, and is at a much lower system cost than current methods. The system and method described herein is capable of finer (e.g., 1 km-scale) spatial resolution.

SUMMARY OF THE DISCLOSURE

One aspect of the present disclosure is the use of a formation of small spacecraft in low earth orbit whose master-clocks are synchronized with each other through the use of two-way time transfer methods. Another aspect of the present disclosure is that the spacecraft payloads includes one or more radio frequency (RF) transmitters and two or more receivers, hosted on satellites at a common altitude, and with appropriate separation in orbital inclination. Yet another aspect of the present disclosure is that these spacecraft execute a coordinated rotational maneuver when passing over a precipitation field region of interest, to enable a multi-static spotlight mode three dimensional (3D) RADAR observation of the precipitation field centered about a fixed ground location. Simultaneous, phase-sensitive sequences of RF echoes from the precipitation field by synchronized receivers are separated in parallel orbital tracks by a measured baseline distance, and the subsequent joint processing of these signals to reveal the 3D distribution of the precipitation field. In some cases, the location of the center of the RADAR observation can be selected, in the direction of the orbital track by selecting the time of the maneuver and transmitted RF pulse sequences, and in the direction perpendicular to the orbit track by selecting the separation of the transmitter and one or more receiver pairs.

One aspect of the present disclosure is a synthetic aperture RADAR method comprising, providing at least one transmitting low earth orbit satellite; providing at least two receiving low earth orbit satellites; remotely coupling the at least one transmitting low earth orbit satellite with the at least two receiving low earth orbit satellites; flying the at least one transmitting low earth orbit satellite and the at least two receiving low earth orbit satellites in formation; synchronizing the phases of the at least one transmitting low earth orbit satellite and the at least two receiving low earth orbit satellites; collecting and resolving a plurality of two-dimensional intensity images via the at least two receiving low earth orbit satellites along-track; operating the at least two receiving low earth orbit satellites in spotlight synthetic aperture RADAR mode; aggregating the plurality of two-dimensional intensity images to increase the signal to noise; collecting a plurality of visibility interferograms using cross-track, range-resolved long baseline interferometry via the at least one transmitting low earth orbit satellite; and creating a three-dimensional precipitation field using the aggregated two-dimensional intensity images and the plurality of visibility interferograms.

One embodiment is wherein the satellites are microsatellites. In some cases, the satellites are operating in the Ku-band and an effective aperture is about 15 m providing horizontal resolution of about 1 km and vertical resolution of about 125 m.

Another aspect of the present disclosure is wherein spotlight mode comprises a series of coherently linked echoes collected while the at least one receiver rotates around a target area during which period the precipitation field is effectively stationary. In some cases, the system has a coherent period of integration ($T_{CPI}$) of about 2 ms. In certain embodiments, the system has a cumulative coherent processing interval (CCPI) of about 200 ms.

In yet another aspect of the present disclosure, the method further comprises demodulating and analyzing an incoming wave-form via one of the at least two receiving low earth satellites or the at least one transmitting low earth satellite; deriving a correction signal and transmitting the correction signal to one of the at least two receiving low earth satellites or the at least one transmitting low earth satellite; repeating the demodulating and deriving and transmitting steps amongst the at least two receiving low earth satellites or the at least one transmitting low earth satellite to determine a difference in a frequency and a difference in a phase of an oscillator on each of the at least two receiving low earth satellites or the at least one transmitting low earth satellite; and applying a corrective feed-back term to an oscillator on one of the at least two receiving low earth satellites or the at least one transmitting low earth satellite to shift its oscillation frequency toward that of the oscillator of the at least two receiving low earth satellites or the at least one transmitting low earth satellite, thereby providing synchronization.

In certain embodiments of the method, one of the at least two receiving low earth satellites or the at least one transmitting low earth satellites is a master and the remaining at least two receiving low earth satellites or the at least one transmitting low earth satellites are slaves. In some cases, the synchronization is within 10 ps.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

It has been recognized that the very large velocity difference between the observing platform and the observed precipitation field, when that observing platform is a spacecraft in low earth orbit, overcomes the echo decorrelation limitations previously encountered by researchers when attempting to observe the two dimensional (2D) precipitation fields using synthetic aperture RADAR from airborne platforms. Atlas, D. & Moore, R. K., 1987, "The Measurement of Precipitation with Synthetic Aperture Radar," Journal of Atmospheric and Oceanic Technology, vol. 4, pp. 368-376. It is further recognized that multi-static synthetic aperture RADAR (SAR) observations of the precipitation fields which employ a plurality of receivers on different spacecraft at different cross-track orbital positions and which preserve phase difference information between the different receivers provides information on the cross-track precipitation field structure. When combined with the 2D SAR information gathered by each receiver, the system enables, through appropriate signal processing, a three dimensional (3D) reconstruction of the precipitation field. It is further recognized that phase-coherent processing of the back-scattered signals from multiple receivers is enabled by a close synchronization of the local oscillators of the various receivers, and that this synchronization is enabled by precise synchronization of the various spacecraft master-clocks for each spacecraft hosting a receiver.

In order to better understand the initiation and the development of extreme weather events, the spatial and temporal resolution of measurements of atmospheric precipitation fields and their dynamics must be substantially improved over current methods. These atmospheric observations are essential for the development of advanced cloud-permitting and cloud-resolving numerical weather models, and for improving the sub-scale parameterization of precipitation fields for current numerical weather prediction (NWP). Additionally, using these high spatial and temporal resolution regional observations, a system can be cued and targeted to areas of special interest by an earth-observing system of systems, and can play an important role in improving severe weather forecasts.

It is understood that improving resolution to convective scales on the order of 1 km will go a long way towards characterizing the space time variability of precipitation processes. Ground-based precipitation RADAR observations also demonstrate the need for higher spatial resolution. Current methods show substantial heterogeneity of the precipitation field on the 5 km scale, which is greater than the size of the core of many mid-latitude thunderstorms. The size of current-generation, space-based precipitation RADAR footprints as well as their high spatial variability makes physical interpretation of current precipitation RADAR observations very difficult and challenging. Observing the field at 1 km horizontal resolution, as disclosed herein, will provide substantial benefits for physical interpretation and the understanding of precipitation field structure.

The present disclosure represents a high-resolution, three-dimensional, multi-static precipitation RADAR approach that employs agile microsatellites, in formation and remotely coupled, via a new high-precision, ultra-low power, remote timing synchronization technology. This system and method uses multi-static RADAR interferometric methods implemented via a microsatellite formation to synthesize an effectively large (e.g., 15 m) aperture to provide about 1 km horizontal resolution and about 125 m vertical resolution in the Ku-band.

While advanced numerical weather prediction ensemble forecasting systems can perform well under many conditions, they experience challenging situations where the ensemble forecasts diverge and passive mapping sensor observations are not sufficient to differentiate between these divergent ensemble forecasts. Under these conditions, high-resolution, all-weather observations such as the system and method described herein can be cued to provide critical inputs to the forecast. In some cases, sounders could detect conditions of atmospheric instability that may drive severe weather and provide cues for high-resolution observation. In such an application, a cued observing system's functional capabilities should include the following attributes: it should be steerable, regional, low-cost to enable, multi-look, re-configurable, scalable, evolvable, networked, resilient, and the like.

A critical enabling technology for the system and method described herein is an ultra-low power, Precision Active Timing Synchronization (PATS) system for the various master clocks carried by the several, different spacecraft (e.g. satellites) that comprise the multi-static precipitation RADAR system. The application of this multi-platform clock synchronization to the 5 picosecond (ps) level is not limited to multi-static RADAR systems as will be discussed in some additional embodiments of the present disclosure.

The core capability that enables these observations is the precision measurement of subtle changes in spacecraft-spacecraft spatial separation along the orbital track, a capability directly related to the time-of-flight between them. An improvement from the current 10 ns range to the less than 10 ps range of the present application would provide an important improvement in that capability, while simultaneously reducing cost.

More generally, the precision timing synchronization system would allow for the very close coordination of the actions of different spacecraft, including high-precision formation flying and coordinated coherent many-to-one communications as will be discussed below. The communications channel used to implement this precision active timing synchronization system between different space craft has substantial additional channel capacity, and can be used for other point-to-point or point-ground communications needs of the space craft formation.

The 1 km precipitation field observing capability disclosed herein is implemented using a distributed microsatellite, multi-static RADAR architecture, in low earth orbit (LEO) where: 1) the key functions of illumination, along-track, and cross-track observations of spatial structure are provided by the collective actions of different spacecraft in the formation; 2) periodic regional observations by the formation are enabled by a coordinated back-scan maneuver executed by the formation elements; 3) multi-static, coherent RADAR methods are employed to observe three-dimensional structure; 4) precise ranging via pulse-compression methods are used for vertical structure; 5) a high orbital velocity relative to the precipitation field is used for the coherent SAR imaging observation of along-track field structure; 6) the relative positions of the satellite formation elements enable the observation of cross-track spatial structure using cross-correlation; and 7) precise timing coordination of the various formation elements is enabled by the precision active timing synchronization (PATS) technology disclosed herein.

Obtaining high horizontal resolution at frequencies appropriate for observing the precipitation field from space requires large effective apertures. For example, a 15 m aperture at the essential Ku band is needed for a 1 km horizontal resolution. Real-aperture RADAR with that size can certainly be built, but it would be exceptionally expensive. To provide a three-dimensional field at 1 km resolution, real-aperture RADAR needs to be a complex phased-array or an electronically scanned cross-track approach which adds additional complexity and cost. In contrast, the multi-static, coherent RADAR system of the present disclosure comprises a few miniature, low-cost space-craft to address this challenge in a cost-effective way.

Precipitation RADAR systems that are currently on-orbit are large instruments with kW scale power requirements. Especially when considering how one would increase the spatial resolution of these measurements in an affordable way, the severe power limitations of microsatellites needs to be considered. While no observation system can do everything well, one way forward is to constrain a high-resolution capability within a System of Systems context, as described herein, to observe selected targeted regions.

While classes of satellites have not been officially standardized; many in the aerospace community describe small satellites in a number of categories. Minisatellites are said to be less than 1,000 kilograms. Microsatellites are less than 100 kilograms, nanosatellites are less than 10 kilograms, and picosatellites are less than one kilogram. This leaves anything over 1,000 kilograms as a large, or traditional, satellite.

In certain embodiments of the present disclosure, continuous along-track mapping is not provided. Instead, a spacecraft formation targets a region, and executes a coordinated "back-scan" maneuver to point data collecting apertures at the region of interest for an extended period of a few minutes. Several very high-power observations of several micro-seconds duration (as in present RADAR systems) are replaced with many more lower-power observations spanning several seconds per coherent spatial field. The synthetic aperture RADAR "spotlight" mode of observing, as used in certain embodiments, coherently collects the spatial field and is a natural fit for this observing geometry. In "spotlight" mode, a series of coherently linked echoes are collected while the observer effectively rotates around the target for about 20 ms (during which period the precipitation field is effectively stationary). The back-scan interval of several minutes allows the collection of multiple, coherently observed fields, as well as body steering between the fields in a step-stare fashion, and providing a total regional area of regard of about 2500 km$^2$.

The spacecraft back-scan method is ultimately time-limited by viewing obliquity and orbital motion. However, by focusing on a region of interest, continuous along-track observation by one formation is precluded, and along-track spacing on the order of 100 km separates accessible regions of interest. The observing angles (e.g., spacecraft attitudes) must be re-set between regions. For a microsatellite, the overall solar energy collection and storage capacity limits active observing time as well, limiting the observing duty cycle to only about 5-10%.

Space-based precipitation RADAR using a SAR method must contend with the variation in hydrometeor velocities present in the field being observed which could interfere with observations of azimuthal (along-track) spatial structure. The presence of a distribution hydrometeor diameter size within a range bin is a primary cause of velocity variation, since the terminal velocity of the falling particle is related to its size. Literature has described this concern, which was noted as being very challenging for an airborne SAR, but the potential for a space-borne precipitation SAR was recognized, due to the much greater platform velocity of an orbiting spacecraft (e.g., 25× to 50× greater) relative to that of an airborne platform. It is known that a correlated time-series of hydrometeor field echoes will eventually de-correlate if the SAR coherent period of integration ($T_{CPI}$)

is extended too long. To avoid this decorrelation, T should be notably less than $\lambda/\sigma_{Dop}$, where $\sigma_{Dop}$ is the standard deviation of hydrometeor velocities.

In certain embodiments of the system of the present disclosure. $T_{CPI}$ is constrained to be less than $\lambda/4\sigma_{Dop}$ For typical precipitation fields where $\sigma_{Dop}$ is less than 2.5 m/s and Ku band $\lambda$=2.2 cm, $T_{CPI}$ should be less than 2.2 ms. At the system's orbital altitude of 705 km, the planned 500 m along-track sampling/1 km resolution will be provided with $T_{CPI}$=2.0 ms, satisfying this coherency constraint. Simply put, a single coherent image is collected in such a short time that the precipitation field is effectively frozen in space. Multiple coherent field observations can then be aggregated in the image intensity domain (incoherent averaging) to increase the signal to noise ratio. The system and method is extendable to other RADAR bands, including Ka, X, and W.

It should be noted that the counter-coupling between orbital motion and illumination position characteristic of the "spotlight" mode SAR method used in certain embodiments of the present disclosure has important implications for along-track resolution and sampling. The spatial resolution depends directly on the integration angle, which depends on range (orbit height) and the required spatial resolution. The effective angular rate depends on both orbital speed and orbit height. The coherent period of integration time, $T_{CPI}$, is just the ratio of the needed integration angle and the angular rate.

Strip mode SAR observation geometry has been considered, for which an illuminated patch moves across the field at the orbital speed. In this mode, along-track spatial resolution and sampling rate are linked to antenna length. The best possible spatial resolution is $L_{antenna}/2$, independent of orbit height, and the sample rate is nearly independent of height. Unfortunately, the azimuthal sample rates for unambiguous strip mode observation are quite high, in fact too high for unambiguous sampling of the full vertically extended atmospheric precipitation field, so this mode is not used at this time.

Certain embodiments of the "spotlight" mode SAR implementations of the present disclosure use pulse repetition frequency and coherent field sizes similar to X-band SAR systems in "spotlight" mode (e.g. TerraSAR-X), but the system does not require the longer integration times that a ground-based imaging SAR requires. The SAR method just described for observing vertical and along-track structure provides high spatial precipitation field observations along those axes, but does not resolve cross-track spatial structure. The range-resolved, long-baseline interferometry method disclosed herein was derived from VLBI methods and can resolve cross-track spatial structure in a precipitation field. This approach, depicted in FIG. 1 and FIG. 2, observes the joint visibility between the two receivers, separated by a known baseline, B. As in VLBI, visibility fringes are observed for each receiver-pair. The temporal frequency of these fringes is related to cross-track position of the scatterers in the field. At 705 km, the fringe frequency shifts by approximately 10 Hz per km of cross-track position. The range-resolved visibility is a Fourier Transform of the cross-track precipitation field structure. As in VLBI, there is some ambiguity, and for certain embodiments of the present disclosure, tomographic three-dimensional image construction is used. The temporal correlation of source does not matter as the method works on uncorrelated signals, so the Doppler dispersion described for the along-track case does not apply. VLBI is the most precise method of angular observation yet devised-at any frequency. In fact, VLBI observations of distant quasars are part of the anchoring observations used to define the International Terrestrial Reference Frame.

One benefit of multi-static RADAR is allowing observation of near-surface precipitation fields at positions well-off of the transmitter's orbital track. While down-looking precipitation RADAR eventually will pass over a given region, selecting the region on an orbit-by orbit or day-by-day basis (as a Weather Sensor Web needs) requires the ability to enable observation within hours of the cue. This capability can be enabled by agile receiver satellites (Rx) moving cross-track to adjust the angles with the transmitter satellites (Tx). At the appropriate Tx/Rx spacing, iso-range surfaces are nearly parallel to the ground, allowing ground-clutter-free-returns close to the ground. This behavior is provided by the system of the present disclosure because the "de-ramp" function in the receiver de-modulates based on time-of-flight. Range compensation/de-ramp processing is applied to each echo yielding vertical structure using precision active timing synchronization between transmitter and receiver in the de-modulation. A series of 10 de-chirped echoes within CPI (about 2 ms), constitutes that along-track phase history. The (range) vertical and along-track precipitation field amplitude creates an intensity image. Multiple images over multiple CPIs are aggregated to increase SNR (and average over any speckle effects). The cross-track interferometry collects visibility interferograms with cross-track spatial information and they are used together with along-track/range images for a full three-dimensional precipitation field. A Fourier Transform of visibility yields a cross-track image. Joint-visibility/range phase history data are used together with two-dimensional vertical/along-track data in tomographic re-construction of three-dimensional precipitation field. In some cases, for on-board/ground processing, de-modulation processing from raw echo returns to phase histories are performed on-board and phase histories are processed into interferograms and then into 3D images in ground processing.

One embodiment of the three-dimensional precipitation (multi-static) RADAR system employs separate transmitting and receiving microsatellites in low earth orbit. Two of the three dimensions are provided by rather traditional "spotlight" mode synthetic aperture RADAR (SAR), using orbital velocity to sweep out a synthetic aperture. High spatial resolution information in the third dimension is provided by a range-resolved variation of long baseline interferometry (LBI).

Figure 1:
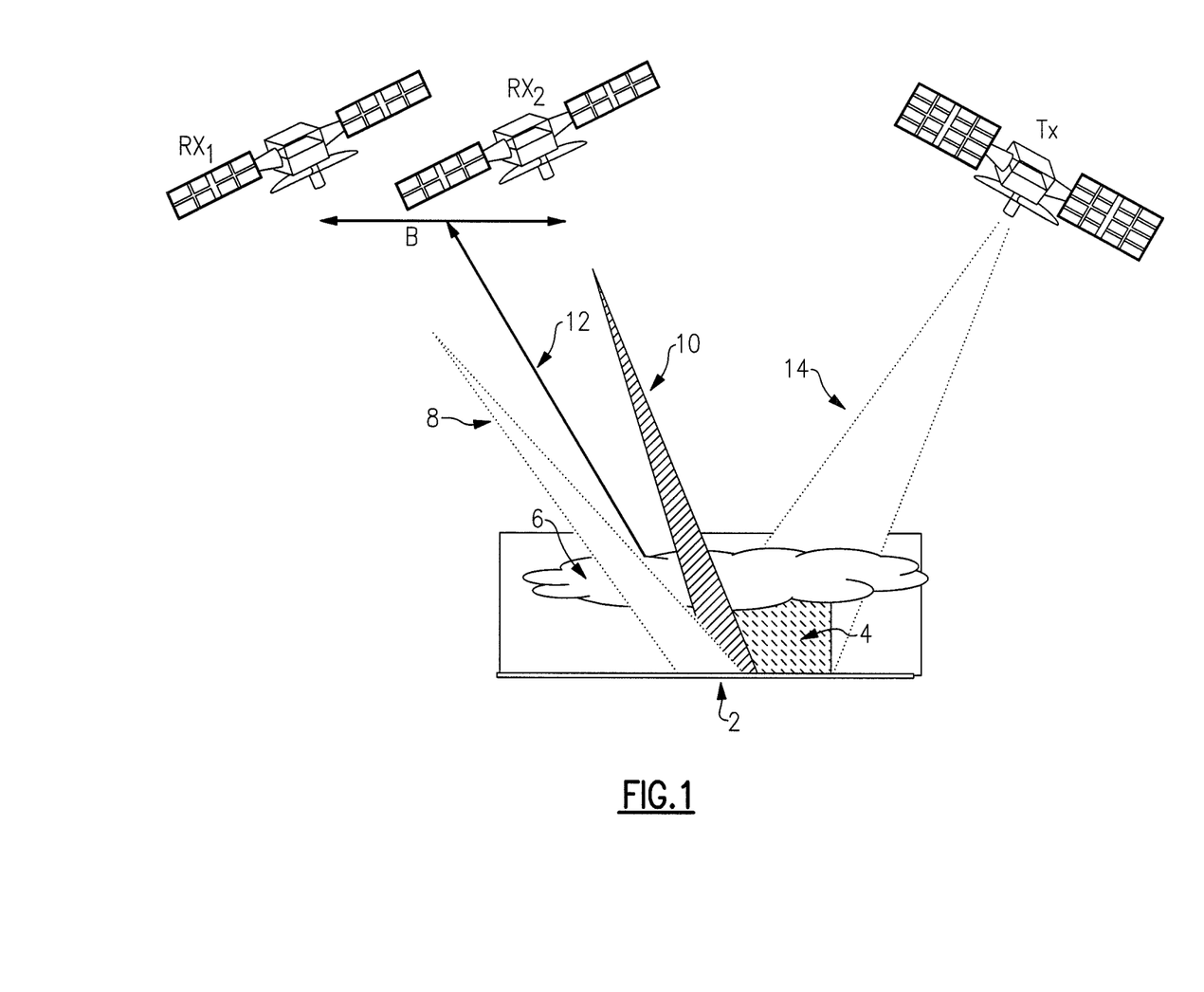
FIG. 1 shows one embodiment of a three microsatellite formation designed to perform two types of interferometric observations according to the principles of the present disclosure.

FIG. 1 shows one embodiment of a three micro-satellite formation designed to perform two types of interferometric observations according to the principles of the present disclosure. More specifically, a first and a second receiver ($Rx_1$, $Rx_2$) are shown with a transmitter (Tx). In certain embodiments, small, agile spacecraft are used as the transmitter and receivers to allow a body-steered transmit beam and multiple receive apertures to provide the "spotlight" mode observation of the present disclosure. As discussed herein, precise time synchronization between Tx and Rx is critical. In some embodiments, the synchronization is RF based and on the order of 1-5 ps. The system RF links several satellites and determines their relative phases and locks them for use in interferometry. The receivers process a series of chirps (encoding the distance) via a phase sensitive reception technique.

Still referring to FIG. 1, the spacecraft velocity vector is out of plane of the figure. The spacecraft along-track motion synthesizes an image of along-track structure (range and along-track). The along-track satellite motion uses short collection periods in "spotlight" mode to analyze range and Doppler very quickly. The 2D calculations are rather straight forward, but the addition of the third dimension via cross-track provides robust results. The third dimension provides volumes for use in the calculation of precipitation rates, etc. In some embodiments, the system provides for a profile of 240×10 km precipitation field 4 at a 1 km horizontal and ⅛ km vertical resolution 2.

The cross-track spatial structure is extracted from cross-correlation of the range and is resolved via the observations from two or more receivers. Waves emitted by the transmitter, Tx, are scattered back to the receivers (in phase coherence with all of the receivers operating at a frequency of interest). In one example, the Ku-band is used and is about 10 GHz. The location of the earth's surface 2 and an intense precipitation field 4, are shown. A transmitted wave 14 is also shown, whereas 8 and 10 indicate the portions of the scattered wave directed toward receivers $Rx_1$ and $Rx_2$ respectively, from a portion of the backscattering precipitation field. The range vector 12 is from the backscattering field to the receiver-pair baseline vector, B. These multiple receivers fly "in formation" and are all aiming at the center of the storm 6, for example, and are said to be operating in "spotlight" mode.

Figure 2:
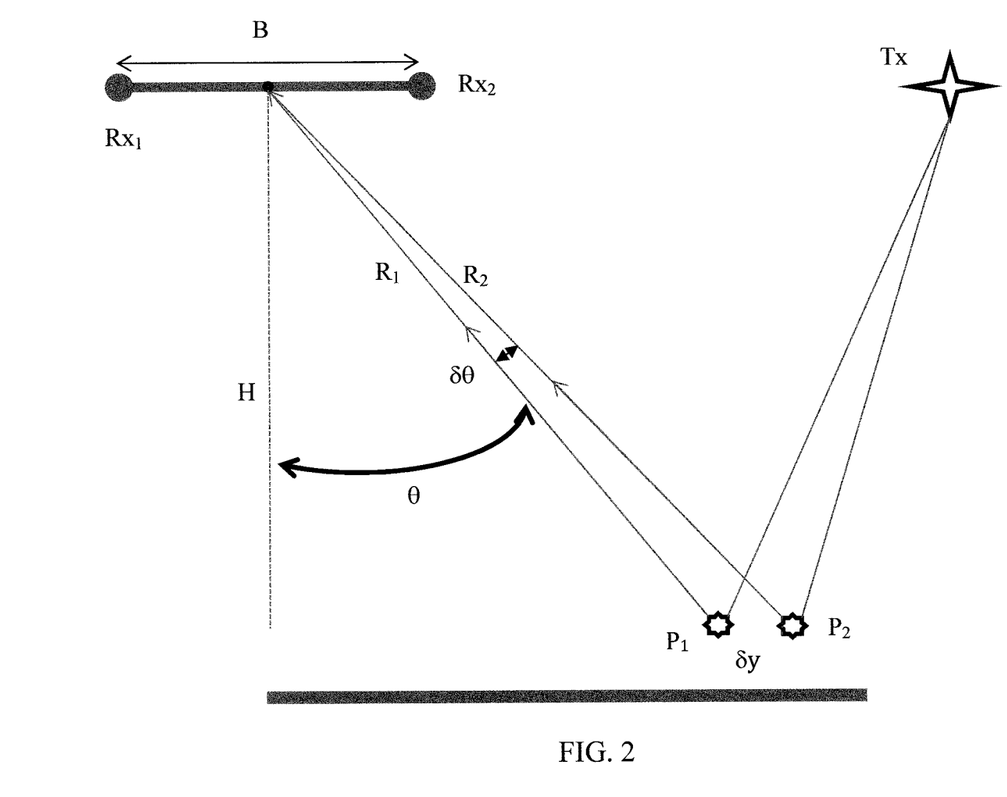
FIG. 2 shows one embodiment of range-resolved long baseline interferometry geometry for observing cross-track structure according to the principles of the present disclosure.

In FIG. 2, the two receivers, $Rx_1$ and $Rx_2$, are separated by a baseline, B, and are in orbit, together with the transmitter, Tx, at an orbit height=H, with each of these progressing along their respective orbits in the direction perpendicular to the plane of the figure at orbit velocity=v. In FIG. 2, two scattering centers, $P_1$ and $P_2$, are shown, at a range R and depression angle, θ, from the receiver-pair, separated from each other by a distance δy, each of which back-scatter radiation from the transmitter toward the pair of receivers. For a single back-scattering center, the combined received field collected by the two receivers will have, upon superposition of the received signals from each receiver, a beat frequency given by $F=(vB/\lambda H) \cos 2(\theta)$, where λ is the wavelength of the transmitted and backscattered signal. When two scattering centers, $P_1$ and $P_2$, are present and separated in the cross-track direction by δy, the difference in the beat frequency received at the receiver-pair is δF, which is the sum of two terms, $\delta F_\theta$, and $\delta F_R$, the formula for each is shown below.

$$\delta F_\theta/\delta y = -(vB/\lambda H^2)\cos^3(\theta)\sin(\theta)$$

$$\delta F_R/dy = -(vB/\lambda H^2)\cos^3(\theta)$$

The difference in beat frequencies between the scattering centers displaced from each other in the cross-track direction, as shown in the figure, allow the backscattered signals from $P_1$ and $P_2$ to be separately measured through Fourier analysis of the combined received signals.

Two receivers ($Rx_1$, $Rx_2$) with a known baseline separation B are used, and the cross-correlation of their signals has frequency-encoded information on the cross-track spatial structure, at each range. This is used together with the two-dimensional SAR imagery (multiple coherent periods of integration) to construct a three dimensional precipitation field map. In certain embodiments, the ALBI baselines need to be long, on the order of about 10-20 km.

Still referring to FIG. 2, each of the two receivers, $Rx_1$ and $Rx_2$, separately collect the backscattered radiation needed to reconstruct a 2D (Range-Doppler) SAR image of the precipitation field in which the spatial dimensions along the orbital track, and along the range axis are resolved in the reconstructed image, but where the spatial information perpendicular to these (approximately cross-track) is not resolved. However, since these two receivers Rx and $Rx_2$ have a precisely known separation, B, and since precise knowledge of time of arrival of the signals at each receiver is observed, a cross-correlation of the received signals at $Rx_1$ and $Rx_2$ contains the information regarding the cross-track precipitation field structure encoded in electrical frequency. Each coherent 2D SAR image is collected over a brief interval, the coherent processing interval, which is chosen to be short enough so that the Doppler spread due to the velocity differences in falling rain drop scattering centers does not degrade the image. In order to improve the signal to noise in each 2D SAR image, a series of these 2D images are collected within a series of coherent processing intervals. Following Fourier transformation (following standard Spotlight SAR methods) these 2D images are added (incoherently) to improve the signal to noise ratio. In contrast, the cross-correlation information using two receivers (resolving the third-dimension) is collected for the entire period of observation, since this cross-correlation is not degraded by the spread rain drop fall velocity.

Current microsatellite technology supports small thrusters with sufficient capability. In a multi-static SAR system, precise common timing knowledge is essential for image reconstruction, and the RF-coupled precision-timing synchronization method described herein enables this observing concept. Separation of the Rx and Tx propulsion also allows for observations of rain back-scatter close to the ground and away from the sub-satellite track, which is key to obtaining a broad field of regard (FOR).

For most space-borne SARs, the overall image field will be an aggregation of multiple (coherently collected, incoherently averaged) sub-fields. In some cases, fundamental coherent imaging sub-field size is about 5×20 km, step-stare collected over image field of regard (e.g. 10×240 km, 20×60 km), at 705 km orbit allowing access to imaging a region over 2 min, with a re-set of spacecraft formation for next composite field within about 20 s to about 500 s.

In one embodiment, a subfield 5 km along-track×20 km cross-track, ×15 km vertical field was collected in 2.5 sec. Each linear frequency modulated (LFM) pulse was about 100 µs, resolving 125 m layers over 15 km. Coherent SAR 5 km (×15 km vertical) image was collected in a 2.0 ms coherent processing interval (CPI). Each SAR image was assembled from 20 pulses (at 5 kHz) and 100 of these were averaged over a non-coherent processing interval (NCPI) of 200 ms. A fundamental cross-track, cross-correlation field size 5×20 km had one cross-track interferogram collected over a cumulative coherent processing interval (CCPI) of 200 ms, and 6 of these were averaged (acquired in 1.2 sec). A subfield Doppler spread characterization was 1 sec of 4 kHz var-PRF (pulse repetition frequency). A composite field, composed of 24 sub-fields was collected during 2-minute over-pass. 2400 $km^2$, or 240 km×10 km (or other combinations) (e.g. 60×10 km) are possible with a "step/settle period" between sub-fields of 2.5 sec for 22-88 µradian steps.

In some embodiments of the present disclosure, there are at least two receivers and at least one transmitter. This is particularly useful in mapping a three-dimensional field of scatterers, such as scattering fields important at RF wavelengths. Such scatterers could include clouds, or fields of dust particles, or blowing sand, as well as fields of rain drops, snowflakes, hail, or sleet, which all have a three dimensional distribution of scattering centers.

In certain embodiments of the present disclosure, there is no transmitter, but there are phase linked receivers that can be used to precisely locate a transmitter from space. In some cases this can have application in precision electronic warfare. This can be true in GPS-denied, and contested environments. A distributed architecture of transmitters and receivers, together with precision synchronization can provide tactical support, surveillance, and low-probability-of-intercept communications. Precision timing synchronization among the elements of a distributed architecture provides a benefit in swarm-to-swarm and platform-to-swarm operations as well.

In other embodiments, there is no receiver but there are phase linked (synchronized) transmitters. This provides the ability to transmit a common signal in unison from multiple transmitters, each operating at low power. Such a capability would enable multiple spacecraft operating at great distance (for example, in orbit around Jupiter) to perform coordinated transmission back to earth in such a way that the transmissions are synchronized, allowing the transmitted signals to add coherently to improve signal strength.

Embodiments of the observing system of the present disclosure employ two signal collection methods and geometries to gather the data needed to reconstruct the three-dimensional precipitation field image. Using Ku-band to enable profiling under most precipitation field densities and P-SAR (bi-static, along-track, "spotlight" mode SAR) to gather traditional two dimensional SAR data in spotlight mode, resolving structure vertically, and along the satellite track. A bi-static mode enables observing far off of normal incidence while still providing low-clutter precipitation field observations within a few km of the surface. The transmitter and receivers are separated cross-track, potentially by 10 s to 100 s of km. The approach gathers data in a limited spatial field (e.g., 5-10 km) along-track, initially in coherent imaging mode (SAR), but then aggregates data from many observations of the field incoherently (intensity-mode).

In certain embodiments, short coherent periods of integration are available due to 1) high satellite velocities, and 2) strong Doppler dispersion for some fields. The about 705 km altitude was chosen in some embodiments to give sufficiently low SAR "rotation rate." In some cases, multi-static, cross-track, ALBI (active long-baseline interferometry) provides cross-track resolution, using joint visibility of the echoes by a pair of receivers separated by a long (cross-track) baseline. A three dimensional image is then constructed using a tomographic approach, with the two dimensional P-SAR image as a constraint.

In one embodiment of the observing system, a single-pulse back-scattered power (z=1) droplet field was assessed. There, the drops were 1 mm drops. A single-pulse/single voxel had a signal to noise ratio of 10:1, which is sufficient. However, a coherent (SAR) processing and a 100× incoherent aggregation brought the image signal to noise ratio to greater than 100:1 for z=1. Solving for $P_{Noise}$, using Eq. 1, with $k_{Boltz}$ T=4×10$^{-21}$, BW=2.4 MHz (SAR linear frequency modulated pulse), NF=Noise Figure=1.4, and Rcvr$_{Eff}$=0.5, $P_{Noise}$=2.2×10$^{-14}$ W. General (backscattered) radiation transfer uses Eq. 2, and back-scattered power per pulse per range sample (for a filled beam of 1 mm droplets) is calculated using Eq.3 and Droplet Number Density: N (D) (1/m$^3$ for Z=1), single droplet RADAR cross section: $\sigma_0$= (1×10$^{-4}$ cm$^2$ for 1 mm drop at λ=2.2 cm); $P_{Trans}$=100 W (peak average transmitted power), $A_{Rcvr}$=π (0.5 M/2)$^2$=0.2 m$^2$, r=750 km (slant range), $\eta_{Eff}$=0.25 (beam geometric efficiency, for 5×20 coverage), $A_{Beam}$=20 km*5 km=20000× 5000$^2$, r=125/2 m, $\Delta P_{Rcvr}$=4.3×10$^{-11}$ W for filled beam-per pulse, $\sigma P_{Rcvr}$=2.2×10$^{-13}$ W for 500×500 m×125 m voxel, per pulse.

$$P_{Noise} = \frac{k_{Boltz} \cdot T \cdot NF \cdot BW_{LFM}}{Rcvr_{Eff}} \quad \text{Eq. 1}$$

$$L_{Rcvr} = E_{Trans} \int\int\int_{Ref\ Vol} \cdot BSDF_{Precip} \cdot dV \quad \text{Eq. 2}$$

$$\Delta P_{Rcvr} = \frac{P_{Trans} \cdot A_{Rcvr}}{4\pi r^2} \cdot \eta_{Eff} \cdot N(D) \cdot \sigma_0 \cdot (x, y, r, \lambda, D) \cdot A_{Beam} \cdot \Delta r \quad \text{Eq. 3}$$

Some preliminary coherent image synthesis checks (along-track) were performed. In spotlight SAR mode, the transmitter and receiver both tracked the ROI, which requires back-scan maneuver by each space craft. The effective rate of rotation about scene=10.5 mr/s (at 705 km orbit altitude). For spotlight SAR, (5 km Along-Track Coherent Patch), Δθ=λ/2δx=0.022 m/2/500 m=22 μradians for a 15 meter synthetic aperture and δθ=λ/2Δx=0.022 m/2/5000 m=2.2 μradians for a 4772 Hz sample rate minimum. A max sample rate for un-ambiguous range observation, showed that 15 km altitude was a useful upper limit for Ku precipitation and that an unambiguous 15 km atmospheric path needs pulse period greater than 200 ms=1/5000 Hz. The CPI limits (for Doppler spread $\sigma_{Dop}$ of 2 m/s rms) λ/4 σDop=2.75 ms was the corresponding decorrelation time lower limit.

Still referring to FIG. 2, the basic observation method used is an active version of long baseline interferometry (range-resolved). The joint visibility function for the receivers separated by B is modulated by satellite velocity, v, acting at radius R=H/cos(θ) creating rotation. The fringe period (angular) on sky is given by λ/(B cos(θ)), the fringe rate (per sec) is F=vB cos 2(θ)/(λH), and the change in fringe rate is $\delta F_\theta/\delta y$=−vB/λH$^2$) cos$^3$(θ) sin(θ), $\delta F_R/\delta y$=− (vB/λH$^2$) cos$^3$(θ). Some example ALBI parameters used in one embodiment were B=20 km, H=705 km, θ=20 degrees, λ=2.2 cm, v=7.5 km/s, 13 Hz/km, and 8545 Hz.

Figure 3:
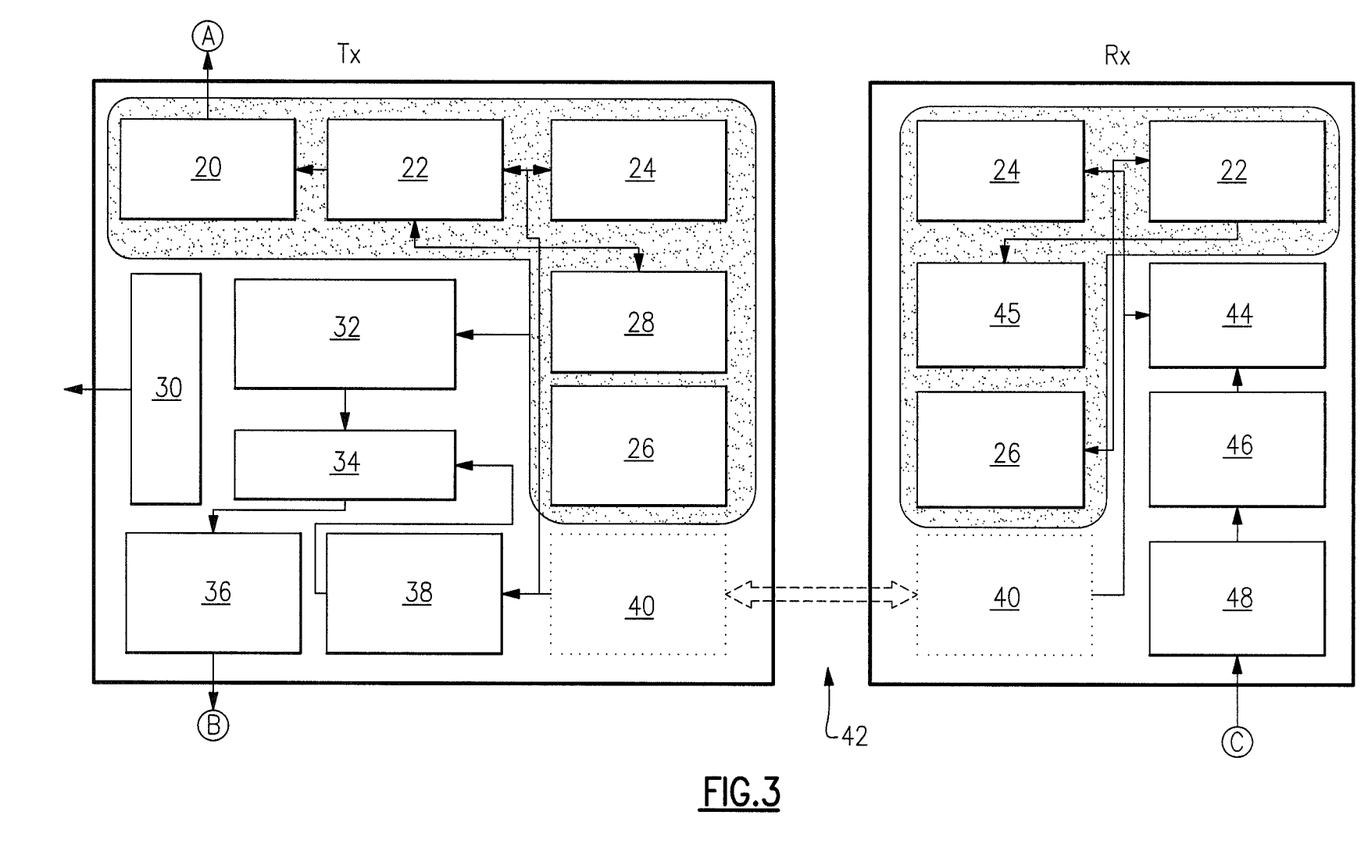
FIG. 3 shows a block diagram of one embodiment of a transmitter (left) and one embodiment of a receiver (right) according to the principles of the present disclosure.

Referring to FIG. 3, a block diagram of one embodiment of a transmitter (left) and one embodiment of a receiver (right) according to the principles of the present disclosure is shown. There, standard subsystems are shown, along with mature-technology subsystems, and new subsystems which are configured to handle the precision timing synchronization of the present disclosure. There, one embodiment of the transmitter Tx transmits data to a command center or the like A and transmits signal B that is received C by the receiver Rx.

Still referring to FIG. 3, several standard and mature-technology subsystems are shown as well as the synchronization module described herein. More specifically, for the transmitter portion of the system, Tx, there is a communication system for interacting with the tracking and data relay satellite (TDRS) system 20 module, or the like. A command and data handling system (C&DH) module 22 is present on both the transmitter (eft) and receiver (right), as well as an attitude control system module, 24, and a satellite power management and storage module 26. Additionally, a precision time and synchronization system (PTSS) communication module 40 present on both the transmitter and the receiver, as described in more detail in this disclosure. In some cases, the PTSS module communicates via an RF link, 42, or the like.

On the transmitter Tx there is also a station-keeping thrust module 28 and a waste heat storage and reject module 30. Additionally, the transmitter Tx has a transmitter power management and storage module 32 and a radar transmitter 34. In some cases, the radar transmitter operates in the Ku band. In some cases, the Ku band radar transmitter has an antenna 36 that measures 2 m×0.5 m in size. In some embodiments, the transmitter Tx also has a sensor control processing module 38.

Still referring to FIG. 3, on the receiver Rx, there is a receiver process control module 44, a configurable reset thrust 45, and a radar receiver 46. In some cases, the radar receiver operates in the Ku band. In some cases, the Ku band radar receiver antenna 48 measures 0.5 m in diameter.

Table 1 shows some SAR imaging parameters for one embodiment of the system of the present disclosure.

TABLE 1

| Attribute | Value | Design-Driving Impact and Other Notes |
|---|---|---|
| Vertical Resolution/ Sampling | 1/8 km Resolution (1/16 km Sampling) | Bandwidth (2.4 MHz), LFM Chirp Rate (for Along-Track SAR) |
| Along-Track Resolution/ Sampling | 1 km Resolution (Sampling at 500 m) | Orbit~705 km/750 km Slant, CPI Duration~2 msec, ⊖ > 22 μr PRF~4800 Hz |
| Cross-Track Resolution | 1 km Resolution | LBI Rx-Pair Baseline > 20 km, Cross-Correlation Period~2 sec per C-FOV |
| Vertical Range | 1-15 km AGL | Pulse Length >50 μsec (nom. 100 sec) PRF <5 KHz (to avoid echo overlap from pulse to pulse) |
| Coherent Field of View (FOV) Length | 5 km (Along-Track) | Tx Along-Track Aperture~2 m AT × 0.5 m CT |
| Cross-Track FOV | 20 km | Tx Power > 100 W peak average (LIMITED Duty Cycle, ~5% orbit average) |
| Vertical Resolution/ Sampling | 1/8 km Resolution (1/16 km Sampling) | Bandwidth (2.4 MHz), LFM Chirp Rate (for Along-Track SAR) |
| Along-Track Resolution/ Sampling | 1 km Resolution (Sampling at 500 m) | Orbit~705 km/750 km Slant, CPI Duration~2 msec, ⊖ > 22 μr PRF~4800 Hz |
| Cross-Track Resolution | 1 km Resolution | LBI Rx-Pair Baseline > 20 km, Cross-Correlation Period~2 sec per C-FOV |
| Sensitivity | <−10 dBZ | Tx Power > 100 W pk @ 40% Duty Cycle, Apertures (1.0 m$^2$), PRF > 4.8 kHz |
| Center Frequency | Ku Band (13.6 GHz, 2.2 cm) | (Pervasive System Impacts), Tx Clock → Rx Clock(s), Synch. Error <11 ps |
| Horizontal Field of Regard (FOR) | 240 × 5 km C-FOV(5 × 20) × 12 (Selectable Pattern of C-FOVs) | CC Period Minimum, Angular Step/Settle Time~1 sec (5-20 μr step), 705 km Orbit |
| No. of Space Craft | 1 Transmitter, 2 Receivers | Minimum formation. Additional spacecraft of each type could be added to the formation, or to a constellation at other nodal crossing time |
| Time Synchronization | <11 ps rms clock-clock jitter | Driven by RADAR frequency |
| Data Collection Duty Cycle | 20% over 10 min ± 60° Latitude (imaging poles) | Regional Observation Period of ~2 min, over followed by 10 minute re-set period prior to subsequent observation set |

The physical design of a first embodiment of the system included one transmitter microsatellite, and two receiver microsatellites. The receiver microsatellite was similar to a CYGNSS spacecraft, in size, mass, power requirements, and functionality. The transmitter microsatellite had either a solid-state or TWTA Ku-band transmitter (both are capable of the needed RF power). In one embodiment, the limited orbit-average power (and the use of spotlight mode) limited the total duty-cycle. In some cases, the transmitter needs to store energy and then operate for a short interval. It may also need to absorb and segregate excess heat quickly, and radiate it to space over a longer period.

In one embodiment, the transmitter spacecraft was about 27 U Size (50 kg total, providing a payload with 50 W orbit-average power). It operated in the Ku-Band with a 100 W peak-power transmitter (LFM Pulses) with a power duty cycle of about 20% using an Energy Management System. The transmitter spacecraft had a deployable 2 m×0.5 m illuminator antenna (3 U stored volume), a PATS Transmit/Receive Antennae, SBC with precision active synchronization daughter card, precision beam-steering (1 mr/sec rates, 0.1 mr accuracy), and station-keeping propulsion.

In one embodiment, the receiver spacecraft (e.g., a minimum of two spacecraft for one application) was about 6 U-12 U size (15 kg total, providing a payload with 15 W orbit-average power, operating a Ku-band 5 W receiver, with a deployable 0.5 m receiver antenna (about 1.5 U stored volume), PATS transmit/receive antennae, SBC with precision active synchronization daughter card, station-changing propulsion (1 m/s Δv) per ¼ orbit, and precision beam-steering (1 mr/sec rates, 0.1 mr accuracy).

Preliminary synchronization tests were performed, showing a timing synchronization jitter of only 7 ps rms, thus meeting the requirement for Ku band, with a fixed offset of only 100 ps after calibration. In certain embodiments, a timing synchronization jitter of less than 3 ps rms, along with a very small timing offset, are possible. In some cases, the hardware implementation comprises a breadboard composed of commercial-grade electronics. More recently, the design approach was been refined to allow the method to be independent of RF carrier frequency, allowing it to be employed at carrier frequencies anywhere in the range 0.3 to 40 GHz. This, in turn, has enabled the key phase-lock waveform synthesis and analysis functions used in the system to be implemented in a low power (e.g., 5 W) CCA with Monobit A/D, which directly samples the Phase-Lock RF wave form. Key DSP functions were provided by the MicroSemi RTG4 FPGA. In other cases, the use of ASIC reduces the power-demand to 1 W/node.

The method of synchronization, using two-way time-transfer, is a specific implementation of a method developed in the early days of RADAR known as tellurometry. This method uses a specifically designed RF wave-form (a Phase-Lock Waveform) that is exchanged between two platforms. In one embodiment, an incoming wave-form is demodulated, analyzed, and used to derive a correction signal that is then synthesized to be transmitted back to the other platform, which applies the same process again. Through this exchange, the difference in the frequency and phase of the reference oscillators on each platform is determined. On one of these platforms (e.g., slave), a corrective feed-back term is applied to the oscillator control to shift its oscillation frequency toward that of the other (e.g., master) oscillator. This method allows low-power (e.g. 200 mW-1 W) master oscillators with moderate stability such as an OCXO (oven-controlled crystal oscillator) to be used as the space crafts' "clocks", and using the present system to obtain and maintain a very precise phase and frequency-lock between them. The method allows multiple remote slave oscillators to be well-synchronized with one master.

A key to performing this synchronization operation at low power is direct digitization of the incoming phase-lock waveform at the carrier frequency, allowing subsequent signal processing steps to be done digitally. This eliminates the need for RF pre-amplifiers, mixers, and intermediate frequency circuitry, and the electrical power that these components draw. The Mono-Bit Receiver discussed above performs this key function. It has been shown to be field operational for frequencies up to 4 GHz. In a recent implementation, a direct A/D up to 40 GHz sample rate was shown in a 45 nm CMOS. In some cases, the synchronization system's function was implemented in a single 6 U 150 CCA.

One aspect of the present disclosure is high-resolution, three-dimensional, multi-static precipitation RADAR that employs agile microsatellites in formation. The microsatellites are remotely coupled via a new high-precision ultra-low power remote timing synchronization technology. This approach profiles a precipitation field at a horizontal spatial resolution of about 1 km and a vertical resolution of about 125 m over a 2400 km$^2$ region. In certain embodiments, the system performs this method using the Ku band and is essential for vertically profiling most precipitation fields. This observing capability enables the characterization of key convective storm processes, at storm-scale, for the first time from space. The approach directly leverages the rapid developments in small satellite technology and launch capability to provide significant capability at a cost point more than ten times lower than other space borne precipitation RADAR systems.

The along-track Spotlight-mode synthetic aperture RADAR (SAR) capability of the present disclosure effectively synthesizes the aperture of 15 m, far larger than affordable, real-aperture precipitation RADAR. High cross-track spatial imaging is provided by a method based on the long baseline interferometry technique used in radio astronomy as described herein. This observing architecture supports process studies by enabling the characterization of storm processes at the spatial resolution needed to update sub-scale precipitation models for future numerical weather forecasting. Over the longer term, this combination of all-weather profiling capability at a low cost will enable a cued, steerable low earth orbit (LEO) regional storm-profiling system.

Certain embodiments of the system of the present disclosure work at least for RF frequencies in the 3-100 GHz range. The specific frequencies that make sense for a weather RADAR are influenced by the strength of the raindrop back-scatter cross-section (which depends on frequency), as well as the available satellite resources, the depth that one needs to "see" into a given storm type, and the technological capability of the time synchronization. In some cases, the choice to use a Ku-band system is a reasonable optimum, as it can "see" through even intense storms, use time-sync technology within current engineering capability, provide 3D imagery of acceptable image size, and resolution, all while using microsatellites of reasonable size and reasonable orbits.

A space-rated implementation of this key technology is a 5 pico-second remote timing synchronization method which uses about 5 W/node. In certain embodiments, a space-hardened circuit card assembly (CCA) level is utilized incorporating an innovative Mono-Bit design that directly digitizes the incoming phase-lock waveform at the approximately 20 GHz carrier frequency and incorporates the innovative phase-lock analysis and synthesis functions of the precision active timing synchronization (PATS) technique of the present disclosure. Heavy-ion testing was also used to evaluate the risk that single-event upsets would introduce excess errors into the synchronization process. This technology enables the miniaturization of multiple earth-observing methods requiring precision synchronization, including high-frequency multi-static RADAR systems.

Figure 4:
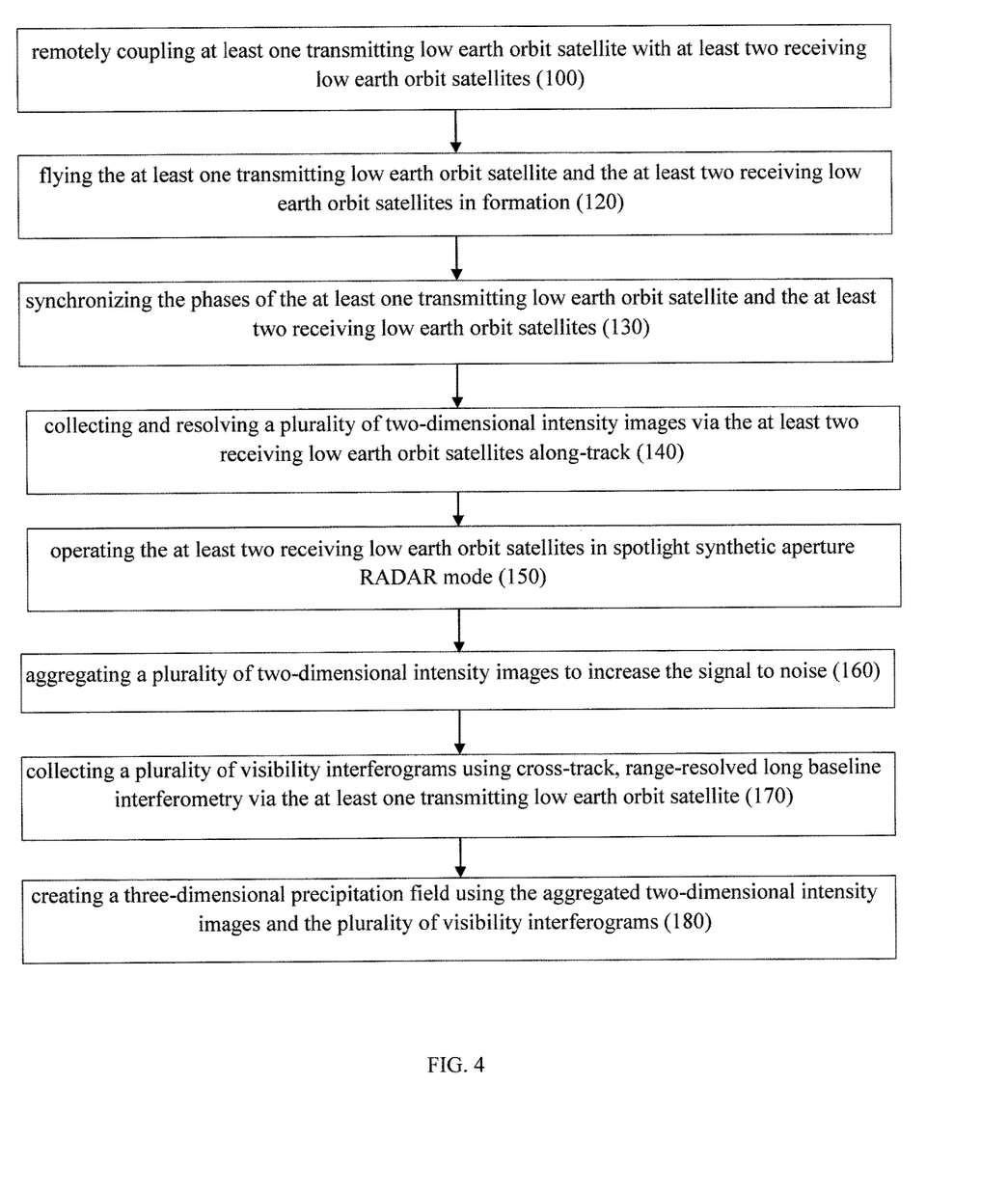
FIG. 4 shows a flowchart of one embodiment of a method for synthetic aperture RADAR.

Referring to FIG. 4, one embodiment of a synthetic aperture RADAR method is shown. More specifically, remotely coupling at least one transmitting low earth orbit satellite with at least two receiving low earth orbit satellites 100 and flying the at least one transmitting low earth orbit satellite and the at least two receiving low earth orbit satellites in formation 120 as well as synchronizing the phases of the at least one transmitting low earth orbit satellite and the at least two receiving low earth orbit satellites 130 allows for collecting and resolving a plurality of two-dimensional intensity images via the at least two receiving low earth orbit satellites along-track 140. By operating the at least two receiving low earth orbit satellites in spotlight synthetic aperture RADAR mode 150 and aggregating the plurality of two-dimensional intensity images to increase the signal to noise 160 and collecting a plurality of visibility interferograms using cross-track, range-resolved long baseline interferometry via the at least one transmitting low earth orbit satellite 170 it is possible for the system to create a three-dimensional precipitation field using the aggregated two-dimensional intensity images and the plurality of visibility interferograms 180.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A synthetic aperture RADAR method comprising,
providing at least one transmitting low earth orbit satellite;
providing at least two receiving low earth orbit satellites;
remotely coupling the at least one transmitting low earth orbit satellite with the at least two receiving low earth orbit satellites;
flying the at least one transmitting low earth orbit satellite and the at least two receiving low earth orbit satellites in formation;
synchronizing the phases of the at least one transmitting low earth orbit satellite and the at least two receiving low earth orbit satellites;
collecting and resolving a plurality of two-dimensional intensity images via the at least two receiving low earth orbit satellites along-track;
operating the at least two receiving low earth orbit satellites in spotlight synthetic aperture RADAR mode;
aggregating the plurality of two-dimensional intensity images to increase the signal to noise;
collecting a plurality of visibility interferograms using cross-track, range-resolved long baseline interferometry via the at least one transmitting low earth orbit satellite; and
creating a three-dimensional precipitation field using the aggregated two-dimensional intensity images and the plurality of visibility interferograms;
demodulating and analyzing an incoming wave-form via one of the at least two receiving low earth satellites or the at least one transmitting low earth satellite;
deriving a correction signal and transmitting the correction signal to one of the at least two receiving low earth satellites or the at least one transmitting low earth satellite;
repeating the demodulating and deriving and transmitting steps amongst the at least two receiving low earth satellites or the at least one transmitting low earth satellite to determine a difference in a frequency and a difference in a phase of an oscillator on each of the at least two receiving low earth satellites or the at least one transmitting low earth satellite; and
applying a corrective feed-back term to an oscillator on one of the at least two receiving low earth satellites or the at least one transmitting low earth satellite to shift its oscillation frequency toward that of the oscillator of the at least two receiving low earth satellites or the at least one transmitting low earth satellite, thereby providing synchronization.

2. The method according to claim 1, wherein the satellites are microsatellites.

3. The method according to claim 1, wherein the satellites are operating in the Ku-band.

4. The method according to claim 1, wherein an effective aperture is about 15 m providing horizontal resolution of about 1 km and vertical resolution of about 125 m.

5. The method according to claim 1, wherein spotlight mode comprises a series of coherently linked echoes collected while the at least one receiver rotates around a target area during which period the precipitation field is effectively stationary.

6. The method according to claim 1, further comprising a coherent period of integration ($T_{CPI}$) of about 2 ms.

7. The method according to claim 1, further comprising a cumulative coherent processing interval (CCPI) of about 200 ms.

8. The method according to claim 1, wherein one of the at least two receiving low earth satellites or the at least one transmitting low earth satellites is a master and the remaining at least two receiving low earth satellites or the at least one transmitting low earth satellites are slaves.

9. The method according to claim 1, wherein the synchronization is within 10 ps.

\* \* \* \* \*